Feb. 2, 1954     D. D. DEMAREST     2,667,883
DISHWASHING MACHINE Filed Jan. 17, 1948     7 Sheets-Sheet 1

INVENTOR.
D. Douglas Demarest

BY *Moses, Nolte, Crews + Berry*
ATTORNEYS

Feb. 2, 1954  D. D. DEMAREST  2,667,883
DISHWASHING MACHINE
Filed Jan. 17, 1948  7 Sheets-Sheet 3

Fig. 3.

INVENTOR.
D. Douglas Demarest

BY *Moren, Nolte, Crewe + Berry*
ATTORNEYS

Feb. 2, 1954  D. D. DEMAREST  2,667,883
DISHWASHING MACHINE
Filed Jan. 17, 1948  7 Sheets-Sheet 4

INVENTOR.
D. Douglas Demarest

BY Moses, Nolte, Cruwe & Berry
ATTORNEYS

Feb. 2, 1954   D. D. DEMAREST   2,667,883
DISHWASHING MACHINE
Filed Jan. 17, 1948   7 Sheets-Sheet 5

INVENTOR.
D. Douglas Demarest

BY Moser, Nolte, Crews & Berry
ATTORNEYS

Feb. 2, 1954   D. D. DEMAREST   2,667,883
DISHWASHING MACHINE
Filed Jan. 17, 1948   7 Sheets-Sheet 6

INVENTOR.
D. Douglas Demarest

BY Moses, Nolte, Cruse + Berry
ATTORNEYS

Feb. 2, 1954　　　　D. D. DEMAREST　　　2,667,883
DISHWASHING MACHINE
Filed Jan. 17, 1948　　　　　　　　　　　　7 Sheets-Sheet 7

INVENTOR.
D. Douglas Demarest

BY Moses, Nolte, Crews & Berry
ATTORNEYS

Patented Feb. 2, 1954

2,667,883

UNITED STATES PATENT OFFICE 2,667,883

DISHWASHING MACHINE

Daniel Douglas Demarest, Little Neck, N. Y.

Application January 17, 1948, Serial No. 2,869

3 Claims. (Cl. 134—176)

The present invention relates to a washing machine, and although it has a wide range of utility, it is particularly useful for washing dishes and other similar kitchen utensils.

One object of the present invention is to provide a new and improved washing machine, which is comparatively inexpensive in construction but nevertheless effective in operation, which is small enough, light enough and compact enough to render it highly adaptable, as for example, for domestic dish washing, which has a minimum number of movable mechanical parts, which affords maximum capacity while occupying a minimum of space and which in certain phases of its operation is hydrodynamically controlled by the washing liquid to effect a playing action of said liquid against the articles to be washed.

Various other objects of the invention are apparent from the following particular description and from an inspection of the accompanying drawings, in which.

Referring to the drawings, the washing machine is shown specifically as a dish washing machine and comprises a housing 10 of generally rectangular shape defining a washing chamber and having a pair of opposed side walls 11 connected together at the bottom by rods 12 serving not only as connecting members for said walls but also as supports for the machine. At opposite ends of the housing 10, above the middle, are cross-rods 13 serving not only as connecting members for the housing walls 11 but also as handles by which the machine can be lifted and carried from place to place.

The upper end of the housing 10 has an opening closed by a cover 16 pivoted by a hinge 17 to the side walls 11 of the housing. Extending between the two opposed side walls 11 are end walls 20 and 21 connected to said opposed side walls by any suitable means. The front wall 20 has a main section 22 extending downwardly, a top transverse flange 23 extending in one direction to the hinge 17 and a lower flange or lip 24 extending in the opposite direction, for the purpose to be described. The rear wall 21 is shaped to conform with certain operating units of the machine to be described.

Figure 6:
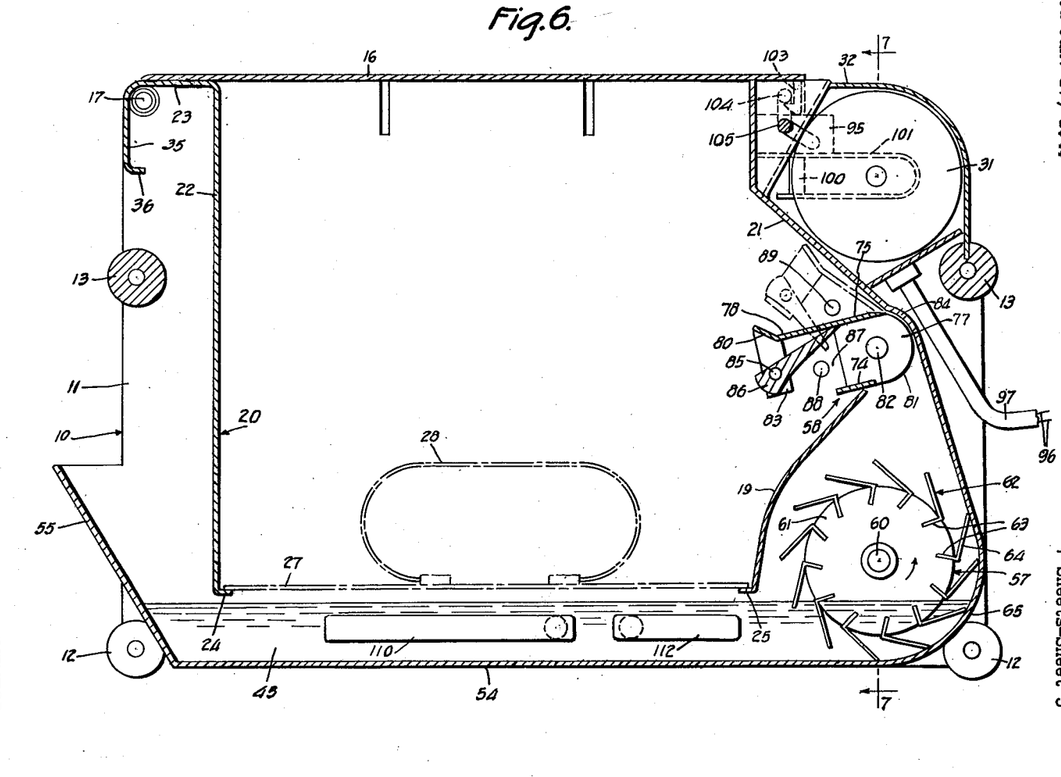
Fig. 6 is a longitudinal section of the dish washing machine taken along the lines 6—6 of Fig. 7 and shown with the basket removed.
Figure 7:
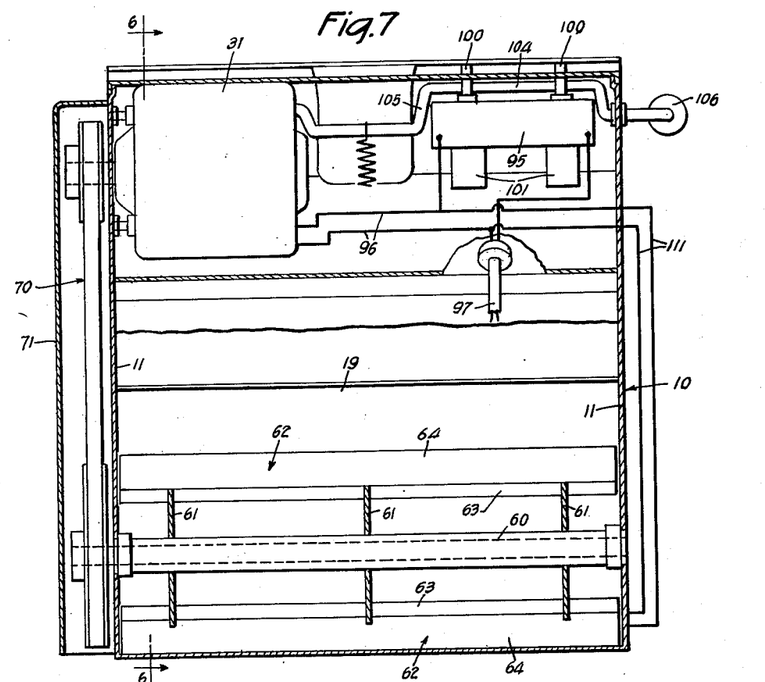
Fig. 7 is a transverse section of the dish washing machine taken along the lines 7—7 of Fig. 6 and shown with the basket removed.

Extending between the side walls 11 and serving as a guard for a water wheel 57 to be described is a partition wall 19 having at its lower end a flange 25 in the horizontal plane of the flange 24 of the front housing wall 20. Removably supported in the housing 10 on the flanges 24 and 25 of the end walls 20 and 21 respectively is a strainer or screen 27 which may be composed of wire mesh or of similar openwork construction provided with a hinged handle 28 which can be folded back against the screen when supporting a dish holding basket and which can be raised as shown in Fig. 6 to permit removal of said strainer. This strainer 27 serves to hold the refuse washed off the dishes, so that this refuse does not get into the circulating washing liquid.

The rear end of the machine is provided with a corner wall member 30 which is arcuately shaped to conform with a motor 31 operating the washing machine and which has a top section 32 forming part of the top wall of the housing. This top wall section 32 has an opening 33 to permit the handle of a pot or pan to extend therethrough when it is desired to wash such a utensil, in cases where such a utensil, is too large to fit entirely in the washing chamber.

The cover 16 has a depending flange 35 at one end with a lip 36 serving to engage the top flange 23 of the front end wall 22 when said cover is opened at about 90°, and to limit thereby the opening movement of said cover.

Figure 4:
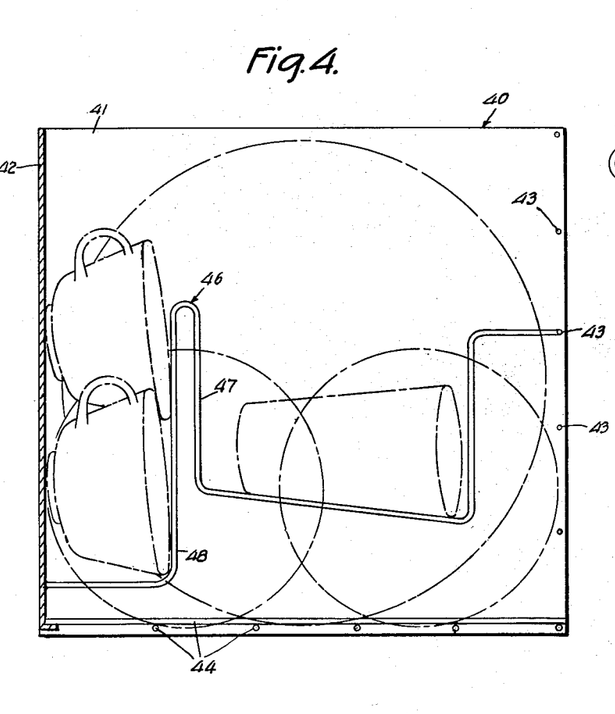
Fig. 4 is a transverse section of the dish retaining basket used in connection with the dish washing machine of the present invention and taken approximately along the lines 4—4 of Fig. 5.
Figure 5:
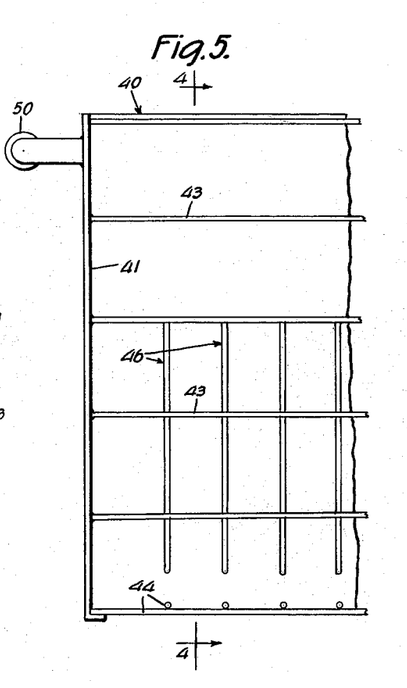
Fig. 5 is a partial end view of the basket of Fig. 4.

A basket 40 shown in Figs. 4 and 5 is adapted to hold the dishes to be washed and forms a removable unit with respect to the housing 10. This basket 40 comprises a pair of opposed side plates 41 connected together at one end by a plate 42 and connected at the other end by a series of parallel rods 43, so that said latter end of the basket is open for the projection of the cleaning liquid therethrough. The bottom of the basket 40 has a series of rods or wires 44 arranged in crisscross fashion and serving to form an openwork structure through which the cleaning liquid can drain very quickly into a sump tank 45.

Also mounted between the basket plates 41 in planes substantially parallel to said plates is a series of rods or wires 46 bent to hold and retain the different dishes and utensils to be washed. For that purpose, these wires 46 are shown bent to form an intermediate U-shaped section 47 for supporting such articles as glasses and the like and having an angular end section 48 serving with the front basket wall 42 to retain cups and the like. The plates and saucers can be supported in upright position between the rods or wires 46. The plates and saucers are desirably supported in the basket 40, so that they extend substantially parallel to the side plates 41, and the vessels such as the glass and the cups are supported so that the open ends thereof face the open end of the basket through which the washing liquid is streamed.

The basket 40 is provided at opposite sides with handles 50 and the side walls 11 of the housing 10 are provided with slots 51 to permit the side arms of these handles to be lowered thereinto when the basket with the dishes to be cleaned is set in position in the interior of the housing 10. In the set up position of the basket 40 in the housing 10, the bottom of said basket is disposed above the screen 27 so that the refuse washed from the dishes will drain on to the screen 27.

The housing 10 is formed with a bottom wall 54 having an inclined extension 55 at its front end between the side walls 11 serving with said side walls as a trough or chute through which the soaped water or other cleaning liquid can be admitted into or discharged from the sump tank 45. This bottom wall 54 is disposed below the screen 27 a sufficient distance, so that the amount of cleaning liquid retained in the sump tank 45 below said screen is ample for washing purposes, when recirculated as will be described.

The cleaning liquid from the sump tank 45 is scooped up by a high speed water wheel 57 and hurled thereby towards the inlet of a nozzle unit 58, which in turn projects said liquid as a high velocity stream through the open end of the basket 40 and against the dishes contained therein. This water wheel 57 comprises a shaft 60 supported in suitable journals in the side walls 11 of the housing 10 and carrying a plurality of discs 61 (three being shown). Supported on the rim of these discs 61 is a series of buckets 62 shown of substantially right-angle cross-section and each having one leg 63 retained in slots in said discs and having their other leg 64 extending substantially tangentially with respect to the periphery of these discs. The rear end housing wall 21 is arcuately shaped at its lower section 65 so that it will be concentric with respect to the water wheel shaft 60 and will be spaced from the periphery of the discs 61 to permit the outer ends of the buckets 62 to ride close to the inner surface of said wall section 65 as the water wheel 57 is rotated in the counterclockwise direction shown in Fig. 6. As this water wheel rotates at high speed in the direction indicated, the buckets 62 carry the cleaning liquid from the sump tank 45 upwardly and hurl it centrifugally at high velocity towards the inlet of the nozzle unit 58. This water wheel is driven from the motor 31 through a suitable belt and pulley drive 70 which is protected by means of a guard 71 secured to one of the side housing plates 11.

The nozzle unit 58 is adapted to be angularly oscillated about a substantially horizontal axis by the hydrodynamic forces created by the liquid passing therethrough and comprises a tubular member 75 of substantially oblong rectangular cross-section having a bottom wall 74, side walls 77 near its inlet end and an upper wall 78 having a flaring outlet section 80. Near the outlet end of the nozzle member 75 are the side walls 83 spaced from the side walls 77 for the purpose to be described.

The nozzle member 75 is pivotally supported for angular movement and for that purpose its side walls 77 have horizontal pivot mountings 82 on the side housing walls 11 respectively. The side nozzle walls 77 are convexly curved at their inlet sections 81 substantially concentrically with respect to the pivot mountings 82, to conform snugly with a curved section 84 of the rear housing wall 21.

Extending between the two side nozzle walls 82 and supported for turning movement about pivots 85 is a vane 86 serving to guide or direct the course of the stream through the nozzle unit 58 and serving as a rudder by which said nozzle unit may be oscillated angularly about its pivot mountings 82. This vane 86 is of wedged shape tapering to a thin edge projecting towards the inlet end of the nozzle unit 58. In order to effect angular movement of the vane 86 about its pivot supports 85, there is secured to each of the side housing walls 11 a pair of superposed pins 88 and 89 extending into the path of movement of the vane 86. The lower pins 88 are cleared by the spaces 87 respectively defined between the side nozzle walls 77 and 83, while the upper pins 89 are cleared not only by said spaces but also by recesses 89 in the upper nozzle wall 78.

Figure 8:
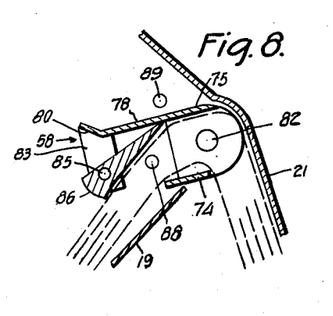
Fig. 8 is a section somewhat diagrammatic of the pivotally mounted hydrodynamically controlled vaned nozzle through which the washing liquid is streamed and shows said nozzle in downward angular limiting position to project the stream downwardly.
Figure 9:
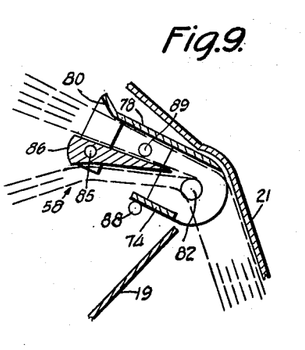
Fig. 9 is a section similar to that of Fig. 8 but showing the nozzle at a subsequent stage, while the course of the stream is being changed automatically by the hydrodynamic pressure on said nozzle.

In the operation of the nozzle unit 58, while said nozzle unit is in the downward angular position shown in Fig. 8, the liquid from the water wheel 57 passes through the inlet of said nozzle unit and is directed angularly downwardly thereby towards the open end of the basket 40, while the vane 86 is in the angular position shown with its outer edge engaging the top wall 78 of the nozzle member 75. In this position, the liquid is applying a force against the top wall 78 of the nozzle member and against the underside of the vane 86, causing the nozzle member 75 with said vane to swing clockwise about its pivot mountings 82, with no relative movement between said vane and said nozzle member and with no angular movement of said vane about its pivot supports 85. As this nozzle member 75 is swung clockwise, the direction of the stream is correspondingly changed. This angular movement of the nozzle member 75 is continued until the vane 86 engages the upper pins 89. At this stage, as the nozzle member 75 rotates clockwise, the vane 86 engaging the pins 89 moves clockwise about its pivot supports 85 and away from the top nozzle wall 78, as shown in Fig. 9, so that the liquid as it is projected from the nozzle unit 58 is divided into two streams by said vane 86. This separation of the stream is only for a short interval.

Figure 10:
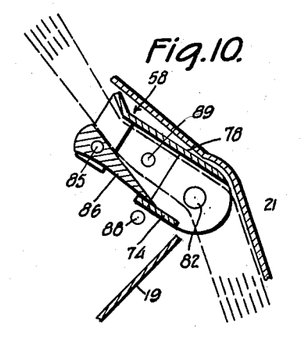
Fig. 10 is a section similar to that of Fig. 9 but showing the nozzle at a subsequent stage and in uppermost angular limiting position at the instant it is being angularly reversed by the stream of liquid coursing therethrough.

As the nozzle unit 58 continues its clockwise rotation about its pivot mountings 82, and the vane 86 is held against the pins 89, the upper surface of the vane 86 and the lower surface of the top nozzle wall 78 will eventually reach a stage where they will converge towards the outlet of the nozzle unit. This convergence produces a component force on the vane 86 rotating said vane clockwise about its pivot supports 85 until it hits the bottom nozzle wall 74, as the nozzle unit 58 reaches limiting position, as shown in Fig. 10. In this limiting position of the nozzle unit 58, the stream is projected from said unit in its uppermost limiting angular direction.

Figure 11:
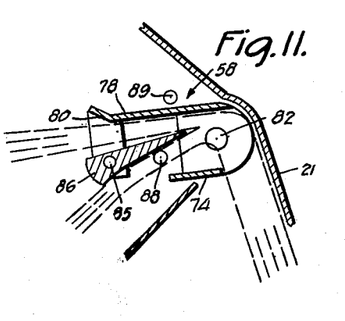
Fig. 11 is a section somewhat similar to that of Fig. 10 but showing the nozzle at a subsequent stage towards its lower angular position.
Figure 12:
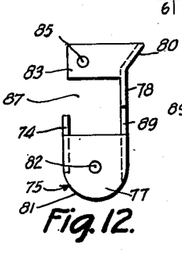
Fig. 12 is a side view of the nozzle.
Figure 13:
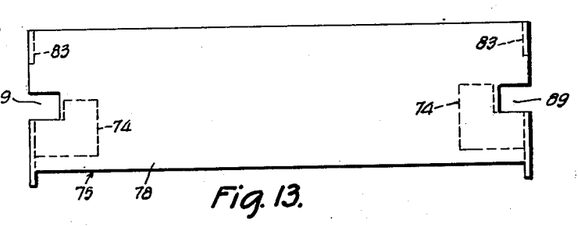
Fig. 13 is a top plan view of the nozzle.
Figure 14:
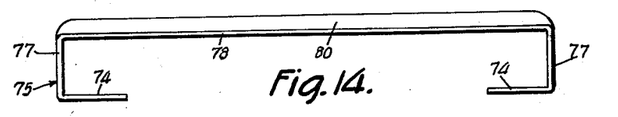
Fig. 14 is an end view of the nozzle.

When the nozzle unit 58 and the vane 86 have reached the limiting position shown in Fig. 10, the liquid as it streams through said nozzle unit applies force to the vane 86 tending to move said vane and thereby to reverse the nozzle unit 58 counterclockwise about its pivot mountings 82. The nozzle unit 58, as it rotates counterclockwise, continuously changes the course of the stream projected from the said nozzle unit and will continue to rotate in this direction until the vane 86 engages the lower pins 88 as shown in Fig. 11. The continued counterclockwise rotation of the nozzle unit 58 about its pivot mountings 82 tends to move the vane 86 counterclockwise about its pivot mountings 85, until it engages the upper nozzle wall 78, in the limiting position of the unit shown in Fig. 8. The cycle through the different stages shown in Figs. 8, 9, 10 and 11 is then repeated.

It is seen that with this nozzle arrangement, the stream of cleaning liquid projected from the nozzle unit 58 is repeatedly oscillated angularly up and down so that every part of the dishes in the basket 40 is cleaned.

Figure 1:
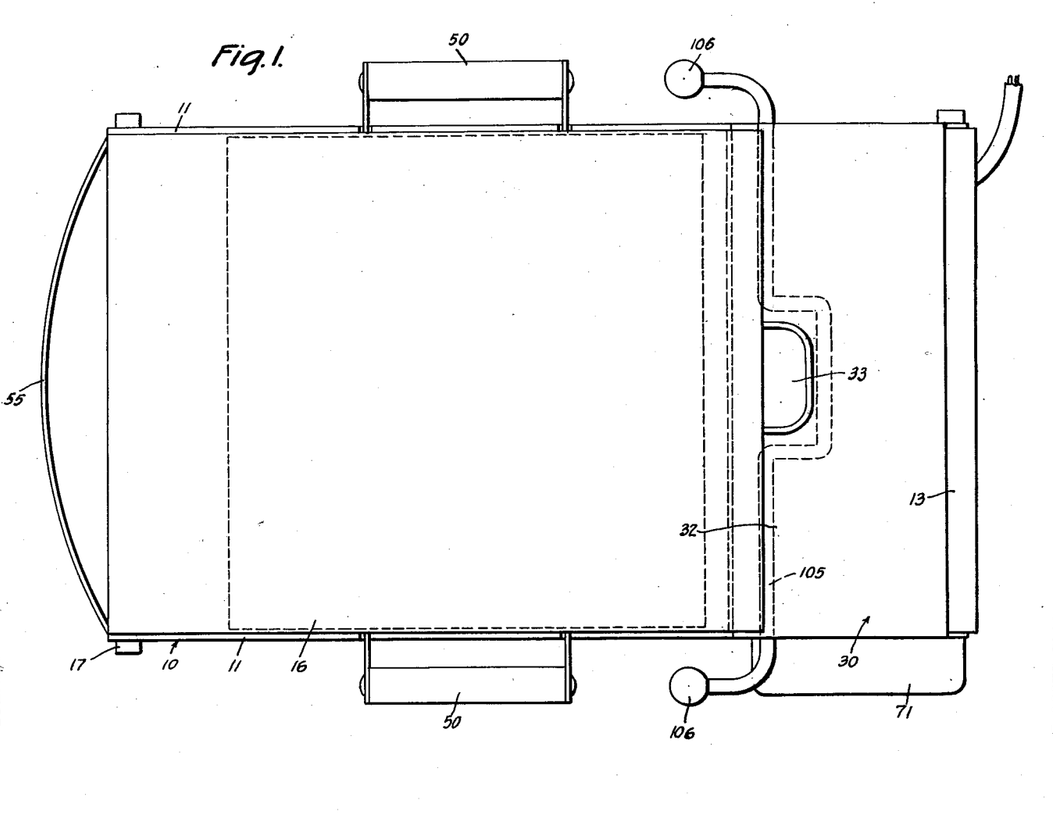
Fig. 1 is a top plan view of a complete dish washing machine embodying the present invention.
Figure 2:
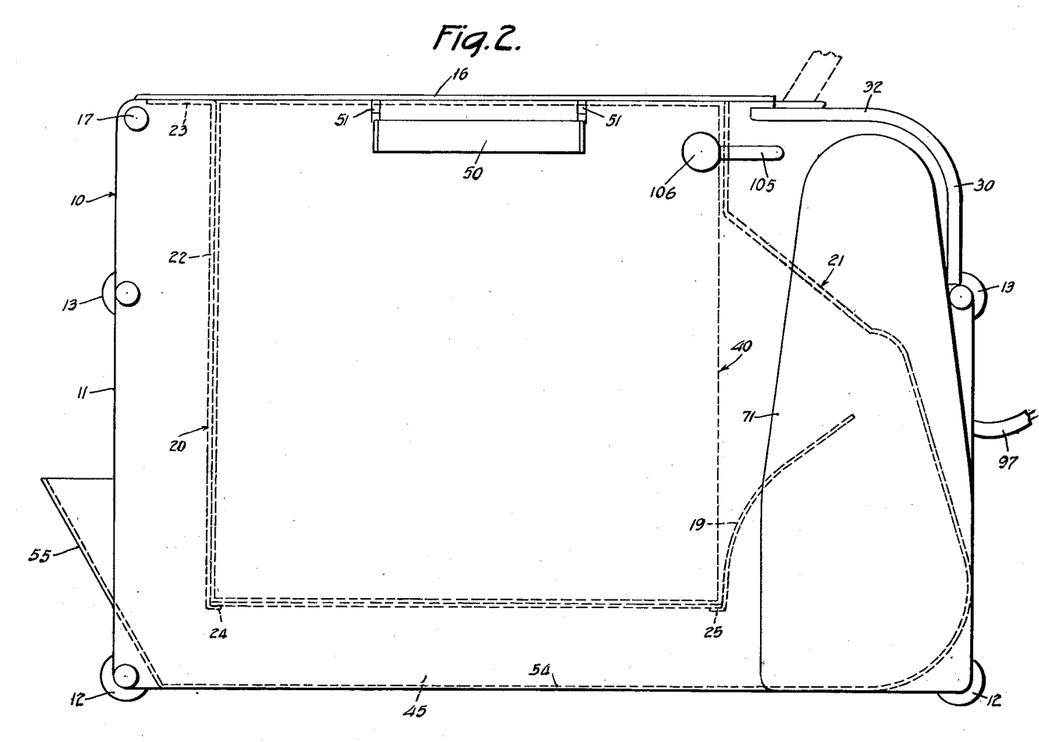
Fig. 2 is a rear elevation of the dish washing machine.
Figure 3:
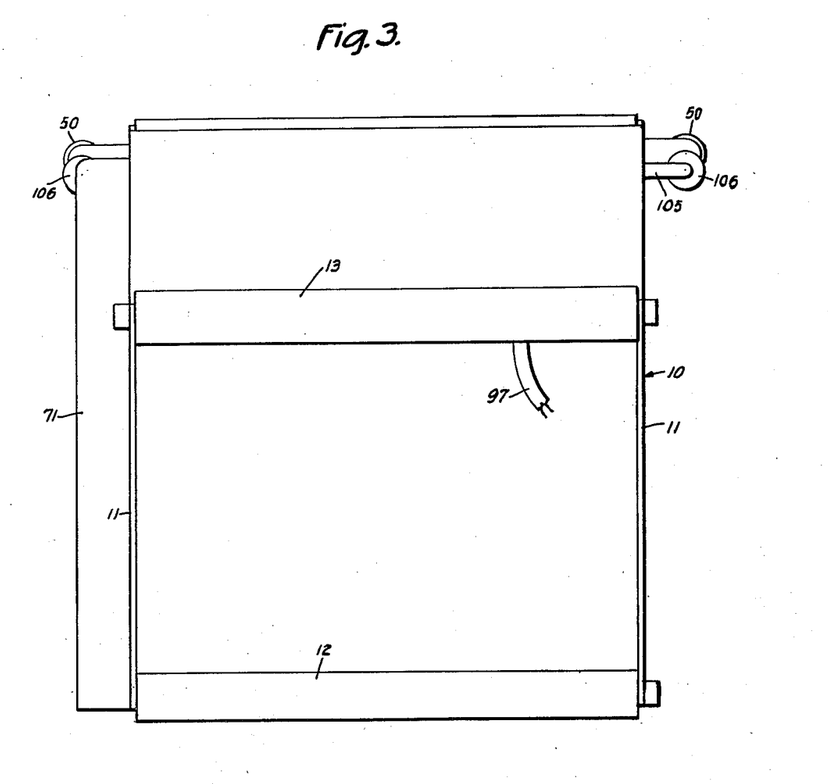
Fig. 3 is an end elevation of the dish washing machine.

The motor 31 is automatically controlled from the cover 16, so that when said cover is closed, the circuit of the motor is closed to drive the water wheel 57 and when the cover is opened, the circuit of said motor is automatically opened to shut down the water wheel. For that purpose, there is provided a switch unit 95 containing two switches for safety, connected in series with the motor 31 through lead lines 96 extending from a conductor cord 97 connected to a suitable source of power such as, for example, the ordinary household outlet. These switches are controlled by a pair of plungers 100, each connected to a respective leg of a leaf spring 101, while the other leg is firmly secured to one of the side housing walls 11. These plungers 100 bear against the underside of the cover 16 near its outer edge and tend to open said cover. However, the cover 16 is held closed against the action of the springs 101 by one or more latches 103 secured to the underside of the cover and hooking on to a crank 104 on a crank shaft 105 which extends across the machine and which terminates at its ends in offset handles 106 on the sides of the machine. By turning either handle 106 counterclockwise from the position shown in Fig. 2, the crank 104 is moved out of engagement with the latch or latches 103 so that the cover 16 is permitted to open under the action of the spring loaded plungers 100. The release of the cover 16 permits upward movement of the plungers 100, so that the switches operated by said plungers are opened. This opens the circuit of the motor 31, and causes said motor to stop and the rotation of the water wheel 57 to cease.

The circuit which operates the motor 31 also operates an electric heater 110 in the sump tank 45 in position to be immersed in the liquid in said tank. This heater is connected to the circuit of the motor 31 by means of wires 111 and is controlled by a thermostat 112, so that when the water in the sump tank reaches a predetermined temperature, the heater 110 is automatically cut off. The heater 110 is turned off and turned on by the opening and closing of the cover 16.

The machine of the present invention can be made small enough to wash at one time all the silver, glass and china used in a normal dinner for two, and by taking out the basket 40 and inserting a frying pan or a pot into the washing chamber with its handle projecting out through the opening 33 in the top wall section 32 of the housing 10, said pan can be effectively washed. The rinsing of the kitchen utensils can be effected by cleaning out the screen 27 of its debris, and replacing the soaped water in the sump tank 45 with clean water. If desired, the rinsing may be accomplished under the ordinary sink faucet, or by removing the basket 40 from the washer and placing it into another vessel containing rinse water.

The machine is also conveniently adaptable for use in a drugstore or small restaurant. In such a case, three of these machines for example, may be employed. The first machine would wash, the second machine would rinse partially and the third machine would apply the final rinse. A fourth machine might be arranged to blow hot air over the dishes and dry them.

While the invention has been described with particular reference to a specific embodiment, it is to be understood that it is not limited thereto, but is to be construed broadly and restricted solely by the scope of the appended claims.

What is claimed is:

1. In a dish washing machine, the combination comprising a housing defining a washing chamber, means for supporting a basket of dishes in said chamber, a nozzle supported on a substantially horizontal pivot axis near one end of said chamber to permit said nozzle to oscillate in a substantially vertical plane and having its outlet directed towards one end of said chamber to project a main solid stream of water for dish washing into said chamber, and means including a vane tiltably mounted in said nozzle on a substantially horizontal axis in the path of the stream therethrough and responsive to the movement of the nozzle to one of its extremes to tilt said vane in a direction to cause it to move said nozzle toward the opposite extreme thereby causing said nozzle to oscillate about its pivot axis by the hydrodynamic action of the liquid streaming through said nozzle, whereby the liquid stream from said nozzle is made to play on the dishes in said chamber.

2. In a dish washing machine, the combination as described in claim 1, comprising a sump tank below said chamber, and a motor driven water wheel in said sump tank below said chamber, to raise the water to the inlet of said nozzle.

3. In a dish washing machine, the combination as described in claim 1, said means additionally including a pair of means mounted on said housing for limiting the movement of said vane.

DANIEL DOUGLAS DEMAREST.

References Cited in the file of this patent

UNITED STATES PATENTS

| Number | Name | Date |
|---|---|---|
| 1,082,259 | Baumiller et al. | Dec. 23, 1913 |
| 1,414,058 | Utterback | Apr. 25, 1922 |
| 1,491,253 | Barnes | Apr. 22, 1924 |
| 1,526,957 | Blakeslee | Feb. 17, 1925 |
| 1,655,280 | Merseles et al. | Jan. 3, 1928 |
| 1,675,192 | Murdoch | June 26, 1928 |
| 1,701,066 | Elkington | Feb. 5, 1929 |
| 1,712,523 | Schneider | May 14, 1929 |
| 1,733,249 | Clinton | Oct. 29, 1929 |
| 1,760,779 | Schmidt et al. | May 27, 1930 |
| 1,806,751 | Fisk | May 26, 1931 |
| 2,154,559 | Bilde | Apr. 18, 1939 |
| 2,217,705 | Rataiczak et al. | Oct. 15, 1940 |
| 2,218,869 | Bilde | Oct. 22, 1940 |
| 2,274,024 | Yochem | Feb. 24, 1942 |
| 2,278,268 | Kempton | Mar. 31, 1942 |
| 2,304,438 | Bilde | Dec. 8, 1942 |

FOREIGN PATENTS

| Number | Country | Date |
|---|---|---|
| 138,280 | Switzerland | June 16, 1930 |
| 587,166 | Great Britain | Apr. 16, 1947 |